United States Patent [19]

Tedrick

[11] Patent Number: 5,094,564
[45] Date of Patent: Mar. 10, 1992

[54] PUSH BROOM HANDLE CLAMP

[76] Inventor: Mark A. Tedrick, P.O. Box 63-8854, Margate, Fla. 33063-8854

[21] Appl. No.: 518,915

[22] Filed: May 4, 1990

[51] Int. Cl.$^5$ .......................... F16B 7/18; A46B 15/00
[52] U.S. Cl. .................................... 403/373; 403/380; 403/258; 15/176.3
[58] Field of Search ............... 403/373, 376, 380, 240, 403/258; 15/159 R, 171, 176.3, 176.6, 176.1

[56] References Cited

U.S. PATENT DOCUMENTS

| | | | |
|---|---|---|---|
| 1,073,034 | 9/1913 | Ford | 403/258 |
| 1,568,484 | 1/1926 | Tolman | 403/380 |
| 1,983,923 | 12/1934 | Stevens et al. | 15/176.3 X |
| 2,312,086 | 2/1943 | Feldman | 15/176.3 X |
| 2,667,653 | 2/1954 | LeFebure | 403/380 X |
| 4,293,972 | 10/1981 | Pomares | 15/176.3 X |
| 4,785,489 | 11/1988 | Van Doehren | 15/159 R X |

Primary Examiner—Peter M. Cuomo
Attorney, Agent, or Firm—Oldham & Oldham Co.

[57] ABSTRACT

A push broom including a handle and a brush block assembly characterized by latching means in the form of a metal plate cooperating together with the handle and the brush block to maintain the handle in the sturdy and properly interlocked position to the brush block so as to eliminate loosening or falling out of the handle.

2 Claims, 1 Drawing Sheet

PUSH BROOM HANDLE CLAMP

BACKGROUND OF THE INVENTION

It has been found in the past that with brooms and brushes of the push broom variety that inadequate mounting for the handle or shaft is a frequent problem. Normally, these handles are either screwed into position, or some type of wire guides or supports are provided from the block back to the handle. All of these prior art methods have the deficiency in that the handle becomes loose from the block, and thus the operability of the broom is impaired, and actual failure between the handle and the block occurs soon thereafter.

A further attempt to solve this problem is represented by Jeffers U.S. Pat. No. 3,891,339, which does show a metal clamping arrangement between a broom handle and a block, but this requires several parts, and is particularly designed for a separate handle, and not one that actually projects into and is mounted as a direct part of the broom block.

SUMMARY OF THE INVENTION

An object of the present invention, therefore, is to provide a new and improved brush block handle attachment arrangement in which the handle is securely attached to the block so that it is strong and durable in use and provides a mounting that is not going to come loose in use even over a long period of time.

A further object of the invention is to provide a unique mounting for the handle to a brush block for a push broom which utilizes a simple metal stamping interconnected with the handle in combination with a rigidizing arm on the block such that strengthening wires or any type of extraneous structure which is objectionable and expensive is eliminated, but requires the use of only three mounting screws and a U-clamp so that it is very easy to mount between the handle and the block itself.

The aforesaid objects of the invention, and other objects which will become apparent as the description proceeds are achieved by an apparatus to mount the handle to a push broom head which comprises a broom block, a handle having its end projecting into a conically tapered opening in the block, a metal plate projecting part way up the handle and flush along the top of the block and extending over the front edge thereof, and a facing bracket connected to the metal strip and secured to the block to maintain the strip in fixed relationship to the block, means to secure the strip at about the middle of the block, and around the handle.

BRIEF DESCRIPTION OF THE DRAWINGS

For a better understanding of the invention, reference should be made to the accompanying drawings wherein.

DETAILED DESCRIPTION OF THE PREFERRED EMBODIMENT

Figure 1:
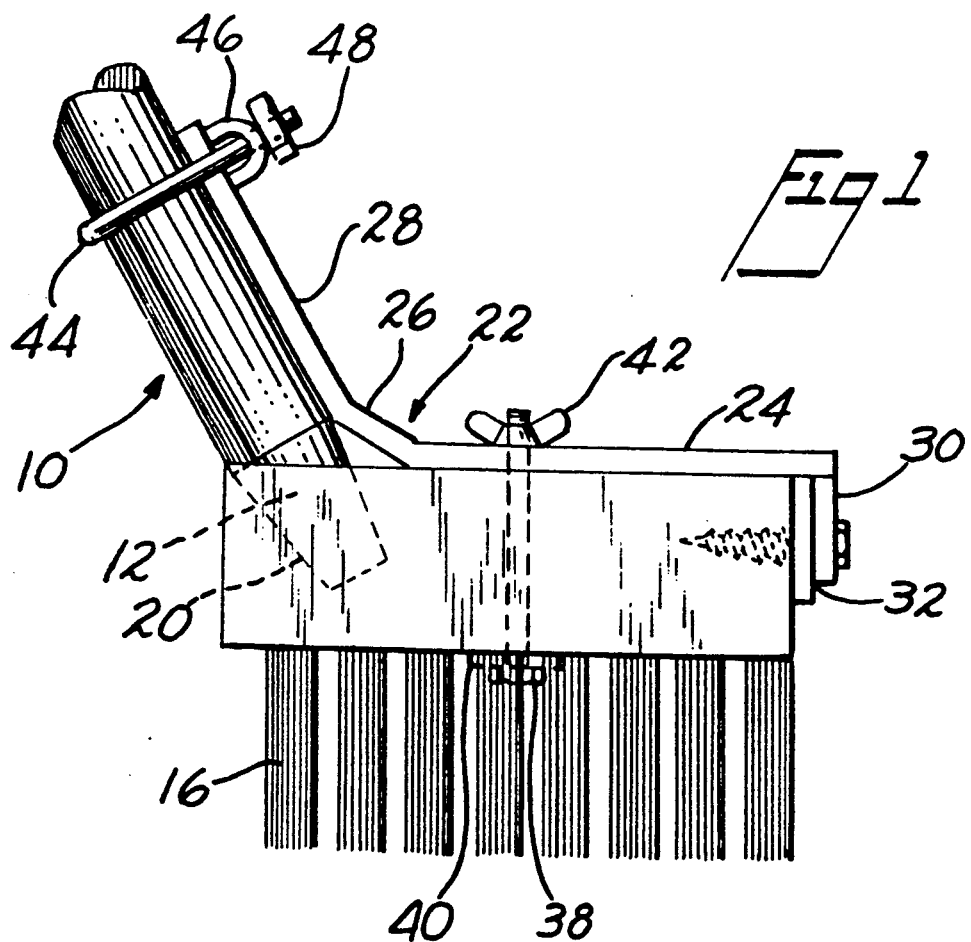
FIG. 1 is an enlarged, broken-away cross-sectional view through the handle and brush block showing the structure of the attaching assembly comprising a preferred embodiment of the invention.
Figure 2:
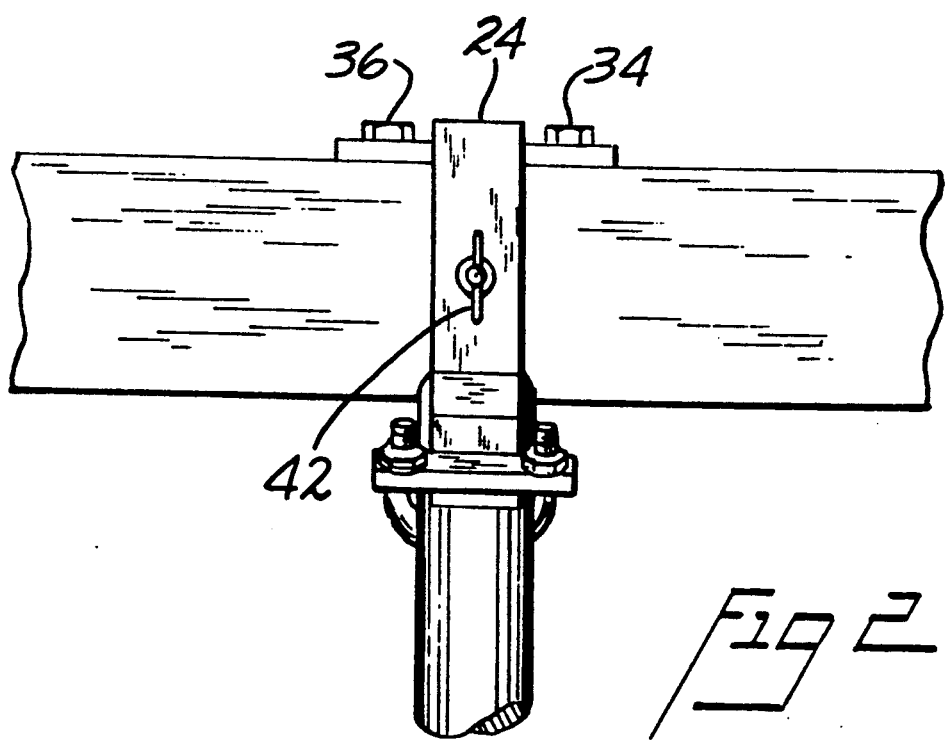
FIG. 2 is a broken away plan view of the attachment assembly of FIG. 1.

Now, with reference to the embodiment of the invention illustrated in FIG. 1 and 2 of the drawings, the numeral 10 indicates generally a wooden broom handle of the type having a conically tapered end portion 12. The handle 10 is attached to a substantially conventional wooden bristle head or block 14 from which the bristles 16 project downwardly, as is well known in the push broom field. The block 14 is preferably of wood and will be normally 3 to 4 inches wide, 1 to 1½ inches thick, and probably between about 18 to 30 inches in length. The bristles 16 will normally be of various degrees of stiffness depending upon the desired use, and will extend down between 2½ and 5 inches from the bottom surface of the block 14.

It should be noted that the tapered conical end portion 12 of the handle extends into a mating hole 20 in the block 14. The apparatus to securely join the handle 10 to the block 14 comprises an elongated metal strip indicated generally by numeral 22 which has a long flat section 24 extending flush across the top of the block 14, a slightly angled section 26 starting up at 2 and joining with a section 28 that lies flush and adjacent to the broom handle 10. The strip 22 also includes an end section 30 which extends down over the end of the block 14, as indicated, and is welded to a facing strip 32. Strip 32 is adhered to the block 14 by a pair of wood screws 34 and 36, thus holding strip 22 in an essentially perpendicular position across the face of block 14, as best seen in FIG. 2 of the drawings.

A bolt 38 extends from the bottom of the block 14 and includes a washer 40, and the nut 42 on the end holds the strip 22 in position at about the center of the block 14, again, as clearly shown in the combination of FIGS. 1 and 2. The actual attachment of strip 22 to the handle 10 is by a U-shaped double ended screw 44 which passes through a reverse U-clamp 46 and then is bolted at 48 on both sides of the handle 10. Naturally, tightening down the pair of nuts 48 on each end of the U forces the U-shaped clamp 46 into a very strong pressured relationship of the bar 28 against the flush relationship against the handle 10, as shown. The strip 22 is preferably just a little bit less in width than the diameter of handle 10, and hence there is a full flush relationship of the strip end 28 against the handle 10, as clearly shown in FIG. 1.

Hence, it should be seen that the strip 22 is mounted very simply by the two wood screws 34 and 36, the bolt 38, and the U-shaped bolt 44. This gives a very stable relationship of the handle 10 to the block 14, and is a much simplified arrangement from that multi-piece and more complex arrangement of Jeffers U.S. Pat. No. 3,891,339.

While in accordance with the patent statutes, only the best known embodiment of the invention has been illustrated and escribed in detail, but it is to be particularly understood that the invention is not limited thereto or thereby, but that the inventive scope is defined in the appended claims.

What is claimed is:

1. Apparatus to mount a handle to a push broom head which comprises:
   a metal strip extending down the handle, across the head, over a front face thereof, and
   means to secure the strip to the front face of the head, to the middle of the head, and to the handle, wherein the strip includes an elongated slot to receive a bolt for mounting the strip to about the middle of the head, and, wherein the strip is slightly less in width than the diameter of the handle, and a U-shaped clamp mounts the handle to the strip, said bolt mounts the head to the strip, and wood screws mount an end portion of the strip to said front face of the head.

2. An apparatus according to claim 1 where the broom handle fits in a hole in the head and is held in place by the apparatus.

* * * * *